United States Patent [19]

Clark

[11] Patent Number: 4,903,607
[45] Date of Patent: Feb. 27, 1990

[54] COMMUNICATION LINK WINDING AND DISPENSING PROJECTILE

[75] Inventor: James Clark, Arlington, Va.

[73] Assignee: Optelecom, Inc., Gaithersburg, Md.

[21] Appl. No.: 227,987

[22] Filed: Aug. 2, 1988

[51] Int. Cl.[4] ............................................. F42B 13/56
[52] U.S. Cl. .................................... 102/504; 242/159;
  244/3.12; 89/1.34
[58] Field of Search ...................... 102/504; 244/3.12;
  89/1.34; 242/159, 172, 173

[56] References Cited

U.S. PATENT DOCUMENTS

| | | |
|---|---|---|
| 2,285,789 | 6/1942 | Woolley . |
| 2,372,383 | 3/1945 | Lee . |
| 2,805,622 | 9/1957 | Camin-Christy . |
| 3,266,423 | 8/1966 | Simpson ............................... 102/504 |
| 3,575,083 | 4/1971 | Hudick et al. . |
| 3,586,563 | 6/1971 | Fukami et al. ....................... 242/159 |
| 3,673,963 | 4/1972 | McGowan . |
| 3,837,624 | 9/1974 | Dandurand . |
| 3,868,883 | 3/1975 | Tucker ...................... 89/1.8 |
| 4,271,761 | 9/1981 | Canning et al. ...................... 102/504 |
| 4,326,657 | 4/1982 | Arpin et al. . |
| 4,770,370 | 9/1988 | Pinson ................................ 244/3.12 |

Primary Examiner—Harold J. Tudor
Attorney, Agent, or Firm—Kerkam, Stowell, Kondracki & Clarke

[57] ABSTRACT

A communication cable winding is disclosed which is protected from heat, turbulence and friction during unwinding by a plastic skirt which surrounds a portion of the winding on a spool or bobbin. An outer portion of the cable may also be provided with a protective overlayer which forms the outer layer of the winding not protected by the plastic skirt.

7 Claims, 2 Drawing Sheets

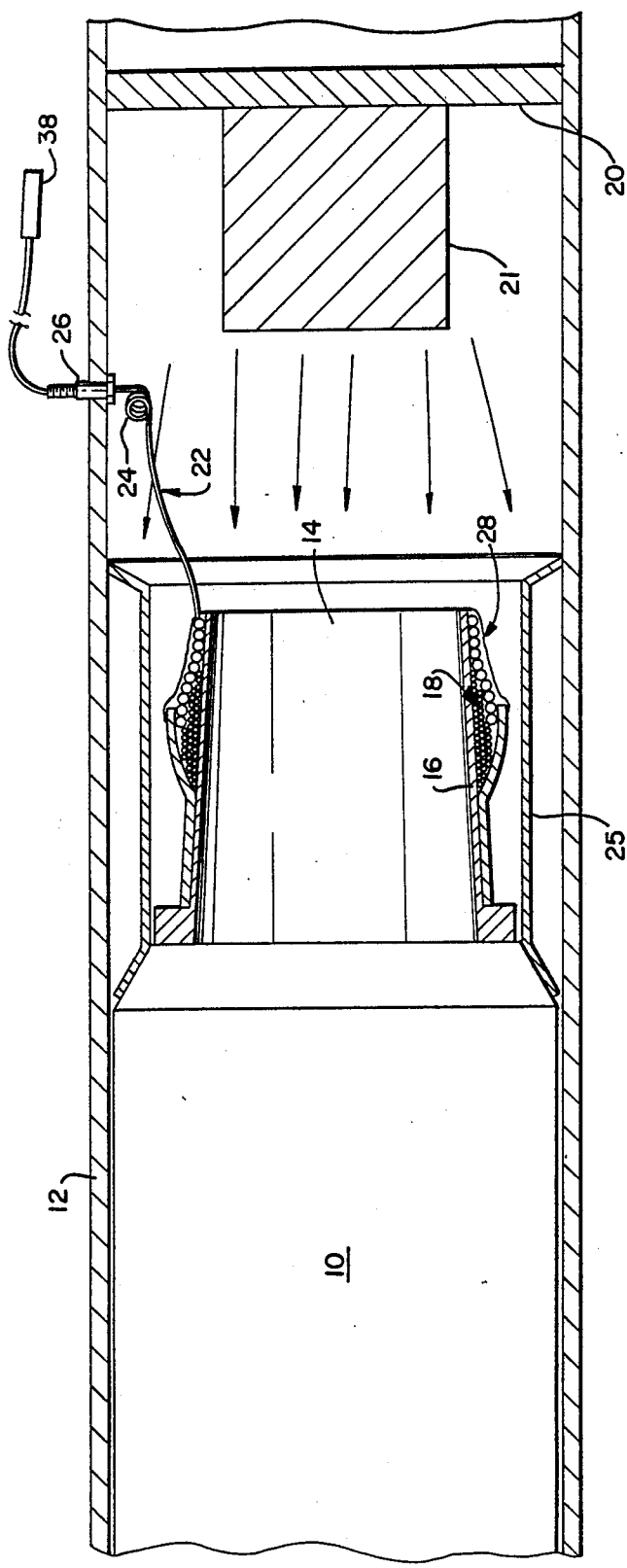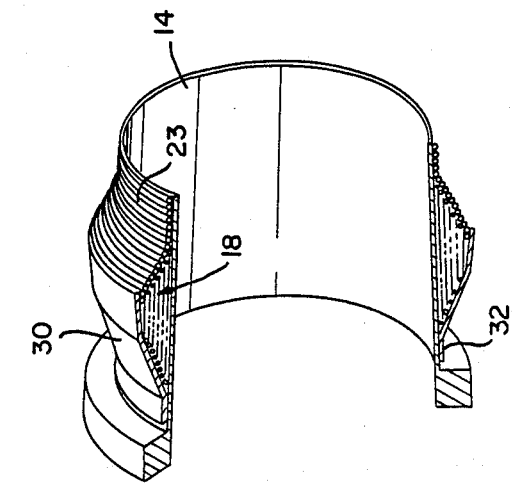

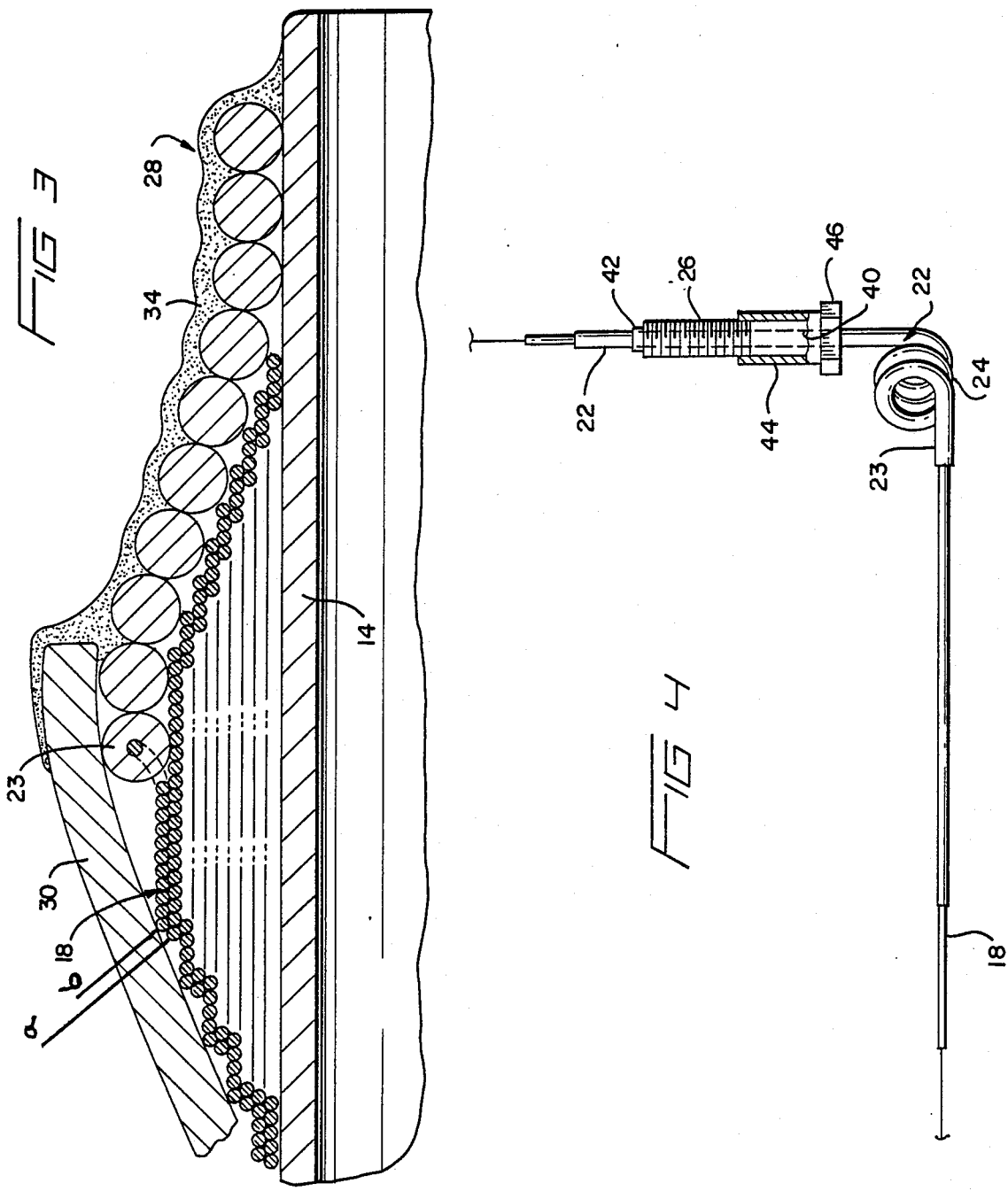

COMMUNICATION LINK WINDING AND DISPENSING PROJECTILE

THE INVENTION

This invention relates to deployment of a communication link, line, fiber, wire or cable which may be contained in a fuel or explosive propelled projectile and more particularly to a blast protected winding for the communication link.

BACKGROUND OF THE INVENTION

The deployment of cables, wires, optical fibers and the like carried by projectiles is well known in the art. Examples of patents employing such dispensing means are:

| U.S. Pat. No. 4,326,657 | Aprin et al |
|---|---|
| U.S. Pat. No. 3,837,624 | Dandurand |
| U.S. Pat. No. 3,673,963 | McGowan |
| U.S. Pat. No. 3,575,083 | Hudish et al |
| U.S. Pat. No. 2,805,622 | Cammin-Christy |
| U.S. Pat. No. 2,363,383 | Lee |
| U.S. Pat. No. 2,285,789 | Woolley |

Throughout the specification and claims the words "communication link" includes optical fiber or fibers, and single and multiple/electrical conductors and combinations thereof.

The use of communication cable to establish communication links under battle field conditions is an important feature of the present invention which has particular utility when the fiber is fed from a blast propelled projectile carried spool of communication cable.

BRIEF DESCRIPTION OF THE INVENTION

A first aspect of the invention is a winding of a communication link cable to be payed out from a moving vehicle. The end of the link may be connected to a stationary point or another moving vehicle. The improvements of the present device provide protection of the link winding prior to and during the first part of the payout process without seriously affecting the speed at which payout may occur or the winding length.

The above is done by means of a protective, formable sleeve over part of the link winding coupled with a section of the winding having a protective overlayer. The section of cable having a protective overlayer is wound on top of the link winding not covered by the formable sleeve. Thus the entire winding is covered by protective material.

To further protect the winding a curing liquid such as silicone rubber or rubber latex, neoprene etc. may be applied over the protected-cable section. This serves to fill any gaps in the winding and forms a seal to the formable sleeve on one side and a seal to the spool or bobbin on the other side. The formable sleeve may also be sealed to the spool in this manner. The material used should not be such that in its cured state it significantly hinders the payout process.

In another aspect, the invention generally relates to an apparatus for deployment of a communication cable comprising a rocket missile or mortar round and launching tube. The missile or mortar includes a body having forward and rearward ends. At the rearward end of the body is a tapered spool upon which the communication cable or link having a first end and a termination end is wound in a plurality of layers. Connectors are provided at each end of the cable and the termination end of the cable is covered with single or multiple layers of plastic such as heat shrink plastic tubing and may be formed into a helical coil while still warm from heat shrinking. The winding is as disclosed in the first aspect of the invention.

BRIEF DESCRIPTION OF THE DRAWINGS

FIG. 1 illustrates in partial section, the rocket missile rearward end; blast or launching tube, the rocket nozzle and the communication cable;

FIG. 2 is a perspective sectional view through the rearward end of the rocket missile illustrating the communication link wrapping, the blast protection skirt and the strengthened terminal end of the link or cable;

FIG. 3 is a greatly enlarged fragmentary sectional view of the winding details of the communication link; and FIG. 4 is an enlarged fragmentary view of the bobbin leader to launch tube assembly.

DETAILED DESCRIPTION OF PREFERRED EMBODIMENTS OF THE INVENTION

The invention will be described with respect to a tube launched rocket missile wherein the communication link comprises an optical fiber. It is to be understood that the optical fiber may consist of several fibers, optical fiber and electrical conductor(s) or just electrical conductor(s). Further the rocket may comprise a mortar round or take other vehicle forms.

Referring to the drawings and in particular to FIG. 1 thereof, the apparatus for establishing a communication link includes a rocket missile 10 and its launch tube 12. The rocket missile in the illustrated example of the invention is a five inch solid propellant type rocket having a conventional outlet nozzle 14. Fitted over the outlet nozzle is a tapered inwardly from front to rear end spool 16 which carries the precision wound plural layer communication link or cable generally designated 18.

Where the cable is an optical fiber the fiber may comprise, as is known in the art, a quartz core, a cladding, and a buffer material which reduces breakage of the optical fiber particularly during winding and deployment.

Formed with the launch tube 12 is an end plate 20 and an explosive charge 21, which charge 21 propels the rocket from the launch tube 12. About the rear end of the rocket and spool 16 is a shroud 25.

The terminal end of the cable generally designated 22, as to be more fully discussed hereinafter, is provided with multiple layers of plastic such as for example, heat shrink polyolefin shrink tube 23. When forming the terminal end 22 and while the polyolefin coating is still warm from heat shrinking a portion of the terminal end may be helicaly coiled as at 24 to provide resilience and strength during the initial launch of the missile. The terminal end passes through a hollow bolt 26 again to be further detailed in respect to FIG. 4 of the drawings. A portion of the heavily coated terminal end comprises the final wrapping of the cable on the spool generally indicated at 28.

Referring now to FIGS. 2 and 3 there is illustrated in greater detail protecting means and winding system for the cable. The protecting means protects the link from the heat, turbulence and friction during missile launch. In FIGS. 2 and 3 there is shown a cable 18, the terminal cable winding 28 and a plastic skirt 30 for blast protection of the cable.

The formable sleeve 30 should be applied such that it physically rests on the underlying winding and spool. This prevents shifting and excessive deformation when external pressure or blast is applied to the structure.

In addition to protecting the winding during handling prior to payout, the winding is also protected from the blast and debris during launch and initial payout. For example, if the spool is mounted on a missile, the winding is protected from the ignition and initial blast of the charge 21. In particular, if the rocket is tube-launched the effect of the initial blast is intensified by the tube enclosure. The present invention will provide protection for the entire winding until the missile has cleared the launch tube.

In the optimal configuration the communication link cable is precision wound on the tapered spool or bobbin 16. The formable sleeve is placed over approximately half of the winding toward the large end of the spool as shown in FIGS. 1 through 3. The sleeve is formed or shrunk tight against both the winding and the spool as shown. The winding causes the sleeve to flair outward toward the narrow rear end of the spool. This flair, coupled with the spool taper, allows the link cable to payout freely along the spool axis from the small end of the spool.

The winding residing under the formable sleeve or skirt 30 is a geometry which allows payout of the communication link to proceed unhindered by the formable sleeve. It is characterized by winding over the preceding layer with the same continuous communication link with opposite pitch. The starting point for this next wind is stepped back from the end of the preceding layer a number of communication link turns. For a layer wound in a helix toward the large end of the spool (covered by the sleeve), the helix will stop several turns back from the end of the previous layer (see (a) of FIG. 3). A continuous transition to the next layer than takes place in which the first turn of the next layer is placed in the valley formed by the last and next-to-last turn of the current layer (see (b) of FIG. 3). This transition is referred to as a stepback of one. If the first turn of the layer is placed farther from the end of the preceding layer, it is a higher order stepback. In general the stepback is 1 turn to 10 turns or more.

The cable 18 with the protective overlayer initially covers the other half of the winding. It is payed out first, uncovering the winding underneath and providing an opening for freely paying out the remainder of the cable. If the spool is mounted on a missile which is to be tube launched then the cable with the protective overlayer continues to wind on the small end of the spool for a length sufficient to allow the spool to exit the launch tube and the blast effects to disperse such that when the communication link is exposed it is unharmed.

The skirt 30 is cemented or otherwise connected to the outer surface of the missile as illustrated at 32 in FIG. 2 and extends rearwardly to a point covering only the last of the strengthen cable windings FIG. 3. Initial payout is via the heavier cable windings and then to the buffered cable itself. The Teflon blast skirt 30 provides protection for the underlying cable and presents a smooth surface for guidance of the off-reeling of the cable.

The blast skirt may be Teflon or other polyolefin or acrylic material, further as shown in FIG. 3 the most rearward cable windings 28 and the rearward edge of the Teflon skirt 30 are coated with a silicone resin or varnish or lacquer 34 which again helps maintain the spool windings during propulsion of the rocket missile through the launch tube. In respect to the Teflon skirt, a skirt having a thickness of 0.040 inches has proved to be suitable for protection of the underlying cable such as optical fiber. It is anticipated that on a five inch rocket missile as much a five kilometers of communication cable may be spooled where the diameter of the cable is about ten thousandths of an inch. As above set forth each end of the communication cable is provided with a connector which is connected to transmitting and receiving devices of conventional configuration at the launch site and within the vehicle.

Referring now to FIG. 4 the bolt 26 is bored as at 40 to receive the shrink tube coated communication cable leader 22. The extended end of the cable 22 receives the connector 38 either optical or electrical as the case may be which in turn plugs into suitable transmission and receiving electronics not specifically shown. At the outside end of the bolt 26 the cable 22 is anchored by an epoxy seal 42 and in the zone where the bolt passes through a bore in the launch tube, a segment of shrink tube 44 provides a build up of, for example, 3/16" OD. This provides a good seal for the bolt and further the bolt may be sealed adjacent the bolt head 46 to the inside of the launch tube 12 with a quick setting epoxy.

Referring again to FIGS. 1 and 3 it has been found that smoother unwinding of the communication cable is provided where the windings present a step slope at each end.

I claim:

1. A missile and launching tube for deployment of a communication cable comprising a missile body having forward and rearward ends, a spool, mounted adjacent the rearward end of the missile body, a communication cable having a first end and termination end wound on said spool in a plurality of layers, connectors at each end of the cable, the termination end of the cable covered with at least one layer of plastic, a hollow bolt secured at the lower end of the launching tube and through which the termination end of the cable having the at least one layer of plastic is threaded, and a plastic blast protection skirt secured at the forward end of the spool to extend rearwardly over a portion of the cable wound on the spool.

2. The invention as defined in claim 1, wherein the termination end of the cable having the at least one layer of plastic is formed into a helical coil positioned internally of the launch tube to provide additional resilience during the initial stages of launch of the rocket missile or mortar round.

3. The invention defined in claim 2, wherein the termination end of the cable having the at least one layer of plastic, the plastic comprising heat-shrink tubing and the helical formation is formed while the cable is still warm from heat shrinking.

4. The invention defined in claim 2, wherein the rearward end of the plastic blast protection skirt and the rearward portion of the wound cable are coated with a heavy coating of silicone plastic.

5. The invention defined in claim 1 wherein the cable is wound to provide a steep step slope at the forward end and a gradual slope at the rearward end of the cable spool.

6. The invention defined in claim 1 wherein the communication cable comprises an optical grade fiber.

7. The invention defined in claim 1 wherein the communication cable comprises an electrical conductor and the electrical conductor is coated with an insulating buffer coating.

* * * * *